United States Patent
Thibault et al.

(10) Patent No.: US 8,733,847 B2
(45) Date of Patent: May 27, 2014

(54) ASYMMETRICAL ELECTRIC BRAKING ARCHITECTURE FOR AIRCRAFT

(75) Inventors: Julien Thibault, Gif-sur-Yvette (FR); Emmanuel Colin, Paris (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 136 days.

(21) Appl. No.: 12/978,159

(22) Filed: Dec. 23, 2010

(65) Prior Publication Data

US 2011/0155521 A1    Jun. 30, 2011

(30) Foreign Application Priority Data

Dec. 24, 2009   (FR) ...................................... 09 59589

(51) Int. Cl.
*B60T 13/00* (2006.01)
*B60T 8/88* (2006.01)

(52) U.S. Cl.
USPC .......................... 303/20; 303/122.04; 303/199

(58) Field of Classification Search
USPC ............ 188/106 P, 158; 303/20, 122, 122.04, 303/199; 701/70, 76, 92, 97
See application file for complete search history.

(56) References Cited

U.S. PATENT DOCUMENTS

| | | | |
|---|---|---|---|
| 6,402,259 B2 * | 6/2002 | Corio et al. | 303/20 |
| 2005/0110339 A1 * | 5/2005 | Kolberg | 303/20 |
| 2006/0108867 A1 | 5/2006 | Ralea | |
| 2008/0258547 A1 | 10/2008 | Ralea et al. | |
| 2010/0276988 A1 * | 11/2010 | Cahill | 303/20 |
| 2012/0145490 A1 * | 6/2012 | Clary et al. | 188/1.11 E |

FOREIGN PATENT DOCUMENTS

WO    2008/144378 A1    11/2008

* cited by examiner

*Primary Examiner* — Anna Momper
(74) *Attorney, Agent, or Firm* — Sughrue Mion, PLLC

(57) ABSTRACT

An asymmetrical electric braking architecture for aircraft, having plural electro-mechanical brake actuators (EBAs) for selectively applying a braking force on friction elements of braked wheels. The architecture comprises (1) a brake control unit (BCU) for acting in normal mode to generate braking setpoint values in response to a braking order, (2) electro-mechanical actuator controllers (EMACs), each including at least one inverter for supplying power to the EBAs in response to the braking setpoint values, (3) at least one emergency brake power and control unit (EBPCU) including at least one inverter for supplying power to some of the EBAs in response to a braking order; and (4) protection means for channeling power supplied by the EMACs or the EBPCU towards the actuators while preventing power from being diverted towards the architecture.

8 Claims, 3 Drawing Sheets

ASYMMETRICAL ELECTRIC BRAKING ARCHITECTURE FOR AIRCRAFT

The invention relates to an asymmetrical electric braking architecture for aircraft.

TECHNOLOGICAL BACKGROUND OF THE INVENTION

The prevention of common mode failures in complex redundant architectures is an essential design step that is well known to system specialists. Common mode failures are events affecting a certain number of elements in an architecture that are identical or similar to one another, and that are considered as being independent. The use of dissimilar technologies in order to make architectures with asymmetrical redundant systems makes it possible to minimize the risks of common mode failures.

In hydraulic braking architectures, it is well known to make massive use of the dissimilarity principle. The example is given of a hydraulic braking architecture in which:

braking is provided in normal mode by means of a normal brake control unit (BCU) and servovalves (SV) for converting a braking setpoint value generated by the BCU into hydraulic power for the brakes. The normal brake control unit receives braking orders via the pedals, while the servovalves are powered by a normal hydraulic power network;

braking is provided in emergency mode by means of an emergency brake control unit (EBCU), and by direct drive servovalves (DDV); and ultimate braking may be provided by means of a reserve store of hydraulic power and by a braking command coming from the parking control lever.

In that type of architecture, the same functional elements (control units, command/power converters) are kept for the emergency channel as for the normal channel, with the functional elements using different technologies. The asymmetry of technology extends as far as the braking actuator, specifically the brake itself. Said brake may include a double cavity so that one cavity is connected to the corresponding servovalve SV of the normal circuit and the other cavity is connected to the corresponding servovalve DDV of the emergency circuit. Alternatively, the brake may have only a single cavity that is associated with a shuttle valve for receiving hydraulic power from one or the other of the channels, with said two channels being segregated.

In the field of electric braking provided by means of electro-mechanical actuators, dissimilarity generally does not extend as far as the braking actuator. The dissimilarity ends before reaching the device for switching off the motor of the actuator (typically the electric inverter contained in the electro-mechanical actuator controller (EMAC) that powers the electro-mechanical brake actuators (EBAs)).

If it is desired to make such an architecture less sensitive to common mode failures, it is essential to attempt to make the normal circuit redundant in a manner that is asymmetrical, i.e. by duplicating all of its functional elements (BCU, EMACs) by using different technologies so as to obtain a dissimilar emergency mode. Nevertheless, that solution presents the drawback of being very costly, in terms both of size and of cost.

OBJECT OF THE INVENTION

The present invention proposes an innovative architecture making it possible to reduce the risk of common mode failure on the normal system and on the emergency system, but without merely duplicating in dissimilar manner.

BRIEF DESCRIPTION OF THE INVENTION

The invention relates to an asymmetrical electric braking architecture for aircraft, comprising a certain number of electro-mechanical brake actuators (EBAs) for selectively applying a braking force on friction elements in order to slow down rotation of braked wheels, said architecture comprising:

a brake control unit (BCU) for acting in normal mode to generate braking setpoint values in response to a braking order;

electro-mechanical actuator controllers (EMACs), each including at least one inverter for supplying power to the EBAs in response to the braking setpoint values;

at least one emergency brake power and control unit (EBPCU) including at least one inverter for supplying power to some of the EBAs in response to a braking order; and protection means for channeling power supplied by the EMACs or the EBPCU towards the actuators while preventing power from being diverted back towards the architecture.

Thus, the asymmetrical redundancy is not provided by duplicating the equipment of the normal system while using dissimilar technologies, but by proposing an emergency system constituted in a manner that is essentially different, and by providing means analogous to hydraulic shuttle valves, in order to ensure that the power supplied by the EMACs or by the EBPCU does indeed go to the actuators and is not diverted back towards the other system.

BRIEF DESCRIPTION OF THE FIGURES

The invention can be better understood on reading the following description of a particular implementation of the invention.

DETAILED DESCRIPTION OF THE FIGURES

Figure 1:
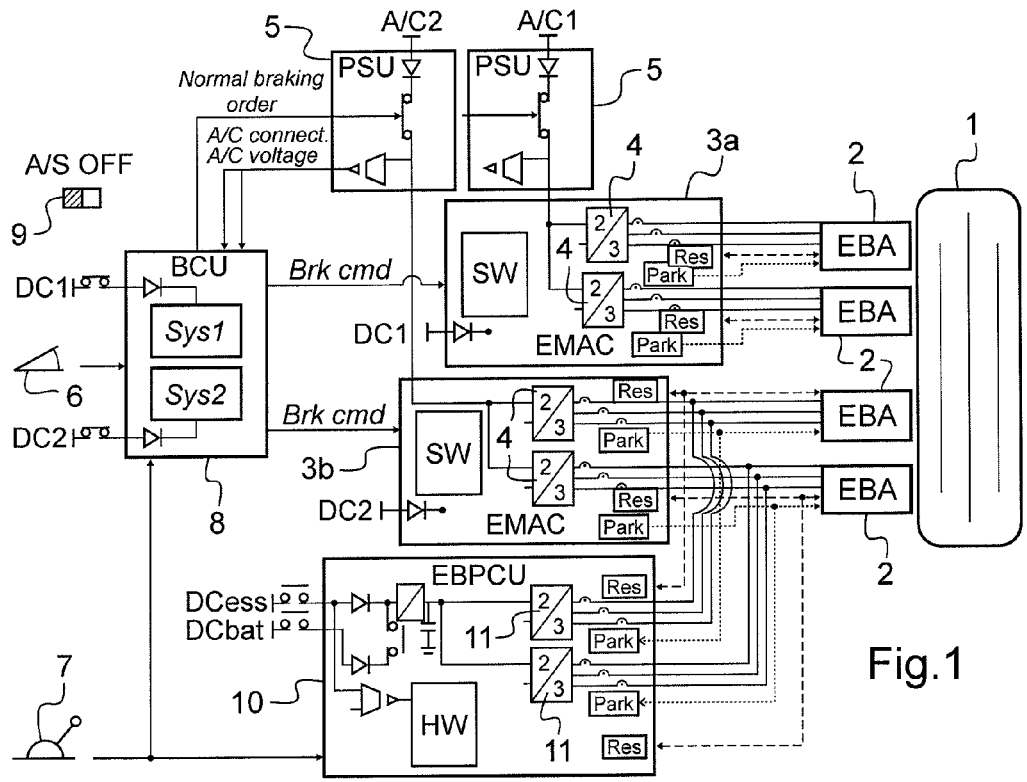
FIG. 1 is a diagrammatic view of an asymmetrical braking architecture in a particular embodiment of the invention, during nominal operation of the braking architecture.

With reference to FIG. 1, the asymmetrical architecture of the invention in this example is applied to an aircraft including a certain number of braked wheels 1 (only one of which wheels is shown), said wheels being equipped with brakes comprising brake disks that are pressed against one another by means of electro-mechanical brake actuators 2 (EBAs). In this example, the brake includes four EBAs. The EBAs of all of the brakes are powered by the EMACs 3a, 3b that each include inverters 4 for supplying electrical power to the EBAs under consideration in response to a braking setpoint value (brk cmd in the figure). In this example, the EBAs of each brake are powered in pairs by two separate EMACs. The EMAC 3a is connected to a first direct current (DC) source DC1 for powering electronic cards (SW in the figure)

included in the EMAC 3a, while the EMAC 3b is connected to a second DC power source DC2 for powering electronic cards (SW in the figure) included in the EMAC 3b. Where appropriate, the EMACs are also able to control EBAs on other wheels.

The alternating current (AC) that, after chopping by the inverters of the EMACs 3, is supplied to the EBAs 2, comes from two power supply units (PSU) 5, that are responsible for calibrating the power coming from two AC power networks AC1 and AC2 of the aircraft.

The braking setpoint values (brk cmd in the figure) supplied to the EMACs 3a, 3b are generated by a brake control unit BCU 8 in response to receiving the braking order coming from brake pedals 6 or from a parking brake lever 7. In known manner, the BCU 8 comprises two calculation channels (sys1 and sys2), each powered by a different DC power source, respectively DC1 and DC2. It is known to make the BCU redundant and to provide at least one second BCU also comprising two calculation channels.

The various elements described above form the normal braking system.

According to the invention, the emergency braking system is constituted as follows: it comprises an emergency brake power and control unit EBPCU 10 including inverters 11 for generating AC power for only some of the actuators 2, this power being derived from DC power coming either from the essential network (DCEss) of the aircraft, or from the battery (DCBat). In this example, only half of the aircraft's EBAs 2 are powered by the EBPCU (specifically, the actuators powered by the EMAC 3b). It is pointed out that, in this example, the EBPCU 10 receives the signal coming from the parking brake lever 7, but receives no signal coming from the brake pedals 6.

Thus, the emergency system is completely asymmetrical. Contrary to the known dissimilarity principle in which the elements of the normal system are merely duplicated by changing the technology used to make said elements, the emergency system in this example is essentially different from the normal system in several respects:
  the EBPCU 10 receives only the signal from the parking brake lever, whereas the BCU 8 receives the signal from the pedals 6 and the signal from the parking brake lever 7;
  in the normal system, the setpoint values are prepared in a unit (the BCU) that is distinct from the EMAC units containing the inverters, while this is not true of the emergency system;
  the inverters of the normal system are powered with AC, whereas the inverter of the emergency system is powered with DC voltage, the source of which is presumed to be independent from the generators supplying the AC power supplies AC1 and AC2; and
  the normal system powers all of the actuators, whereas the emergency system powers only some of the actuators.

Preferably, the emergency system and the EBPCU in particular include no software, but only hard-wired logic means, or more generally hardware means, for determining a braking setpoint value for controlling the associated inverter.

For the actuators under consideration, the emergency system includes fewer power lines than in the normal system. The parking blocking member 2c and the resolver 2b (see FIG. 6) fitted on each EBA 2 are connected to the corresponding EMAC, but not to the EBPCU.

The asymmetry provided in this way is therefore total, while not having recourse to mere dissimilar duplication of elements of the normal system.

In order to apply braking by means of the architecture thus described, the following controls are available to the pilot:
  the brake pedals 6, for slowing down the aircraft;
  the parking brake lever 7, for ensuring that the aircraft remains stationary when said aircraft has stopped moving, or for applying ultimate braking as described below; and
  a selector switch AS/OFF 9, enabling the pilot to indicate whether or not an anti-skid protection system is to be applied.

The various operating modes of the architecture of the invention are described in detail below.

When all of the elements of the normal system are functioning and are normally powered by the various aircraft power sources, the pilot may perform braking in the following modes:
  normal braking mode: with the selector switch AS/OFF in the anti-skid (AS) position, the pilot is able to control deceleration by means of pedals. The BCU 8 then generates braking setpoint values for the EMACs 3, which distribute the corresponding power to the EBAs 2 so as to brake the wheels depending on the desired deceleration; and
  parking braking mode: once the aircraft has stopped, the pilot may ensure that the aircraft is kept stationary by applying parking braking by means of the parking brake lever. The BCU 8 then generates braking setpoint values for the EMACs 3, which distribute the corresponding power to the EBAs 2 so as to press against the brake disks, and then to maintain the braking force for the time it takes to block the pushers of the EBAs 2 in position.

Figure 2:
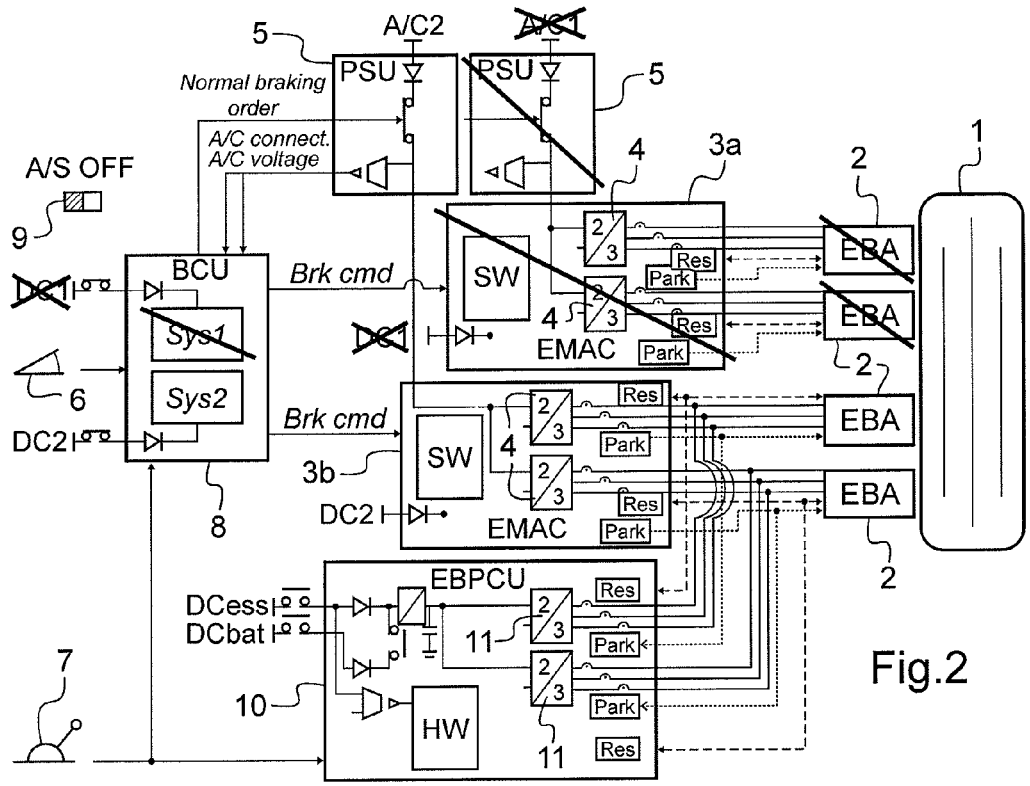
FIG. 2 is a diagrammatic view of the architecture of FIG. 1, during an alternate braking mode, following the loss of one of the power supplies.

In a situation shown in FIG. 2, in which one of the electric generators of the aircraft is faulty, leading to loss of the corresponding AC and DC sources (in this example, loss of sources AC1 and DC1), the corresponding PSU is no longer in a position to provide power to the EMACs 3a. The electronic cards of said EMACS are no longer powered. The EBAs 2 connected to the EMACs 3a are therefore unusable. In addition, one of the calculation channels of the BCU is neutralized by the fact that it too is no longer powered. Nevertheless, it remains possible to ensure braking by using the second calculation channel (sys2) of the BCU 8 in order to generate braking setpoint values for the EMACs 3b that continue to be powered. Said braking mode is known as "alternative mode". In this mode, it is possible to call on the valid EBAs 2 to exert a stronger braking force in order to compensate for the loss of the unpowered EBAs 2. In a variant of the invention, the normal system may include a plurality of BCUs 8. The loss of one DC power source DC1 or DC2, causing each of the BCUs 8 to lose one of its calculation channels, can be compensated by reconfiguring valid calculating channels (those which continue to be powered) in order to deliver setpoint values to all of the EMACs 3.

Figure 3:
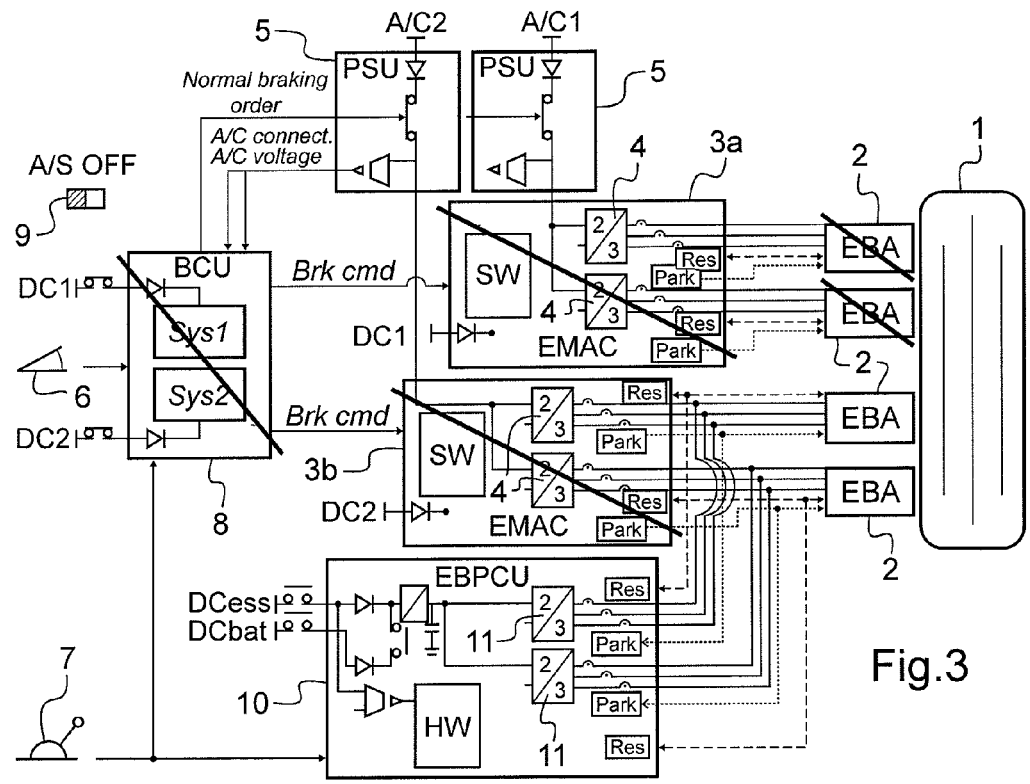
FIG. 3 is a diagrammatic view of the architecture of FIG. 1, during emergency braking, following the loss of one of the essential components of the normal system.

In another situation shown in FIG. 3, during which the BCU 8 or all of the EMACs 3 break down (e.g. in the event of an infinite loop occurring in software and affecting both calculation channels of the BCU, or of the EMACs 3a and 3b, as a result of a common mode failure), it is naturally no longer possible to brake using the normal system. The pilot observes such a situation when no braking occurs when pressing on the pedals 6. The pilot then places the selector switch AS/OFF 9 in the off position. This is the signal given to the architecture to activate the emergency system. This braking mode is known as the emergency braking mode. Braking is thus carried out by the EBPCU 10, which receives a braking signal from the parking brake lever 7 that is actuated by the pilot. The EBPCU 10 then sends calibrated power to the EBAs 2 under consideration in response to actuation of the parking brake lever 7, the power in this example being drawn from the DC power source DCEss. During braking, the pushers of the EBAs 2 are naturally not blocked in position, as they would be during parking braking.

Figure 4:
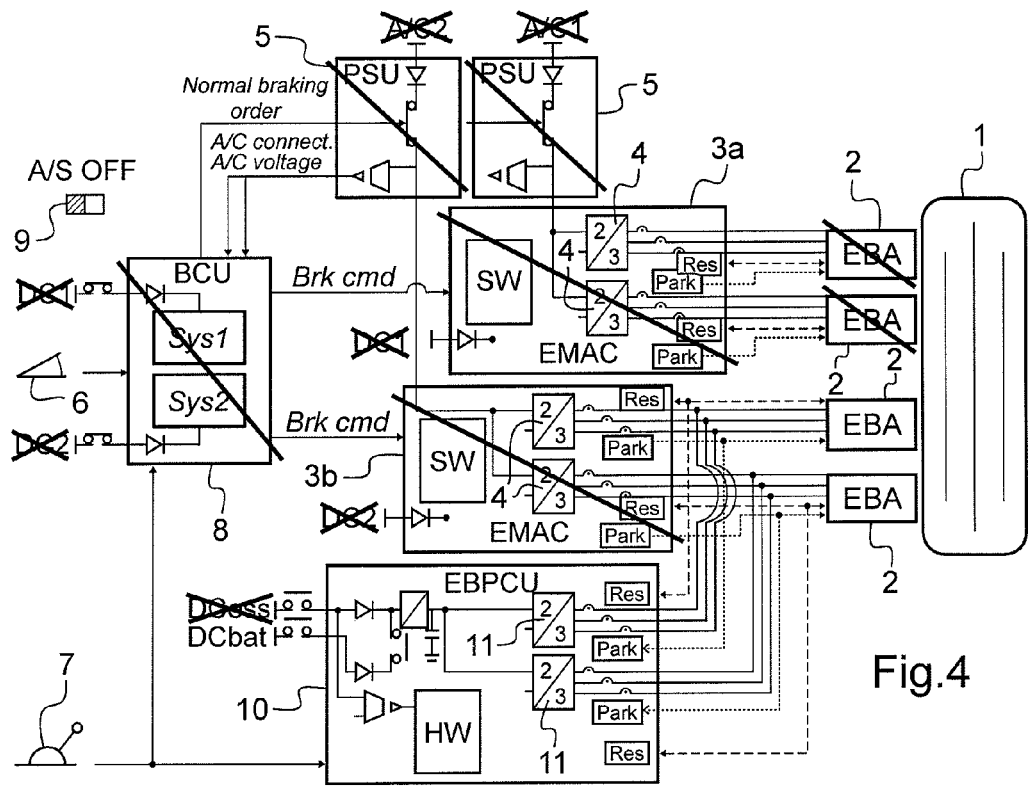
FIG. 4 is a diagrammatic view of the architecture of FIG. 1, during ultimate braking using the emergency unit.

Finally, in a critical situation such as that shown in FIG. 4, it is possible for all of the aircraft's generators to be faulty, in such a manner that no power sources are available apart from the battery. In the same way as for the above-described situation, the pilot receives no response when pressing on the pedals. The pilot then places the selector switch AS/OFF 9 in the off position. The emergency system is thus activated. Braking is then carried out by the EBPCU 10, that receives a braking signal from the parking brake lever that is actuated by the pilot. The EBPCU 10 then sends calibrated power to the EBAs 2 under consideration in response to actuation of the parking brake lever, the power thus being drawn solely from the batteries DCBat. This is the ultimate braking mode.

In a particular implementation designed to save power coming from the batteries, the EBAs 2 can be blocked in a force-applying position, after the first application of force. Thus, the braking force is maintained without consuming power coming from the battery. To this end, the EBPCU 10 is programmed to control the locking member that is fitted onto the EBAs under consideration after application of the braking force so as to block the pushers of said EBAs 2 in position.

Figure 5:
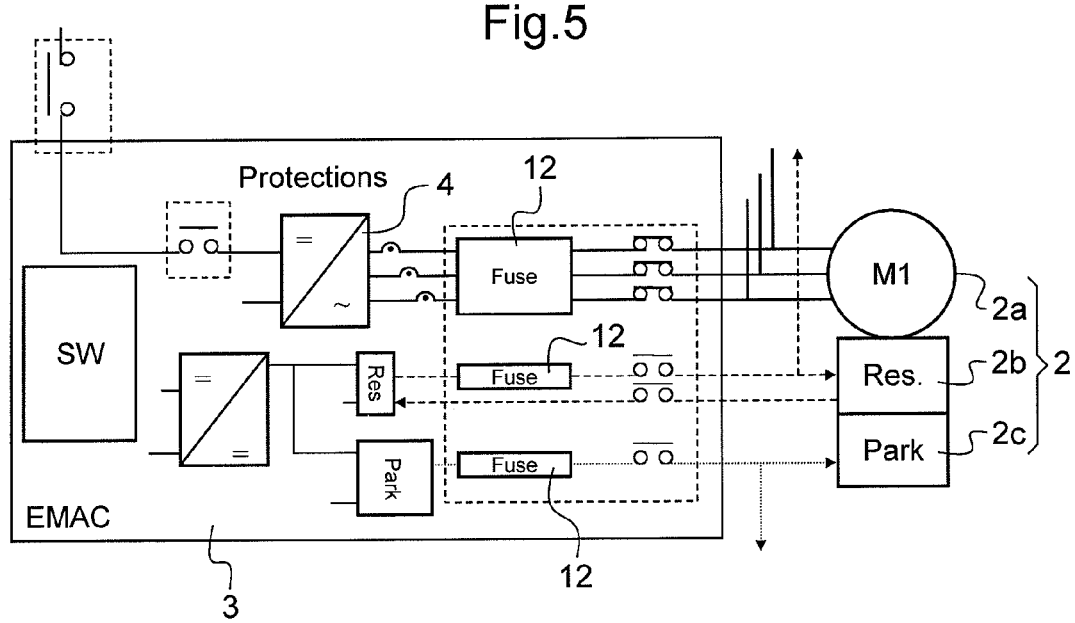
FIG. 5 is a diagrammatic view of an electro-mechanical actuator and of the EMAC.

In an important arrangement shown in FIG. 5, when the emergency system is activated and when the EBAs 2 under consideration receive power from the EBPCU 10, it is advisable for said power to go towards the EBAs 2 and for it not to pollute the EMACs 3 under consideration by causing power to return, in untimely manner, to the normal system. Activation of the emergency system when the EMACs 3 are in a proper operating state cannot lead to power going from the EBPCU 10 towards the normal system, since the power transistors forming the inverters of the EMACs 3 are normally non-conductive, and the inverters are normally disconnected, thus preventing any power being diverted. However, the situation is different if in one of the EMACs 3 under consideration, one of the transistors remains in the conductive position, e.g. following failure of said transistor. In this event, the EMAC 3 under consideration acts like a short circuit, and the power delivered by the EBPCU 10 is likely to be diverted to the normal system via said EMAC. In order to overcome this problem, it is advisable to fit the architecture with protection means in order to guarantee that the power delivered by the EBPCU 10 is indeed channeled towards the EBAs 2, and to prevent power being diverted towards the normal system. To this end, the EMACs 3 in this example are fitted with fuses 12 on their outlet lines, said fuses being adapted, in the event of a transistor remaining conductive in one of the EMACs 3, to disconnect all connections between the EBAs 2 under consideration and said EMAC 3 when power is being supplied by the EBPCU 10 regardless of whether or not the EMAC 3 under consideration is being powered. In this example, the fuses are disposed on all of the connections between the EBA 2 and the EMAC 3, and on the lines supplying power to the motor 2a, to the resolver 2b and to the parking blocking member 2c of the EBA 2. In a variant, the protection means comprise active devices such as (normally open) relays, in addition to or replacing the passive devices constituted by the fuses.

In similar manner, it is also important for the power coming from the normal system, thus the EMACs 3, to be consumed by the EBAs 2 and for it not to be diverted towards the emergency system. To this end, the EBPCU 10 is also provided with fuses on said outlet lines, so that in the event of one of the transistors of the inverter of the EBPCU 10 remaining conductive, the fuses break the connection between the EBPCU 10 and the corresponding EBAs 2, and thus prevent power from the EMACs 3 from being diverted towards the EBPCU 10 when the EMACs 3 are supplying power, and by channeling said power towards the EBAs 2 under consideration.

Thus, the two systems are electrically isolated from each other and do not risk being subjected to power coming from the other system being diverted thereto in untimely manner. It is noted that the fuses 12 are installed in the EMACs and EBPCU upstream from the common points between the power lines coming from the EMACs and the EBPCU that lead to the same actuators.

The above-described asymmetrical architecture may present numerous additional characteristics.

In a particular aspect of the invention, if the pilot uses the parking brake lever when the selector switch AS/OFF 9 is in the AS position, the normal system is then called upon and the BCU 8 can therefore understand that the pilot is trying to carry out parking braking with the pushers of the EBAs 2 being blocked, which may be difficult if the aircraft is still moving. It is therefore advisable to check that the pilot really wants to apply parking braking. It is therefore advantageous to monitor speed information (speed of the aircraft, or wheel rotation speed), in order to check whether the aircraft is moving or has stopped. Parking braking will only be applied if the aircraft has stopped. By way of example, the parking brake lever may be deactivated when the selector switch AS/OFF 9 is in the AS position.

In another aspect of the invention, it may be envisaged to replace the power source DCEss with the source DC1 or DC2 for supplying power to the EBPCU 10. It is known that the source DCEss is a DC power source based on a parallel combination of the sources DC1 and DC2 that obtain their power from respective generators driven by the left and right engines of the aircraft. Thus the asymmetry of the architecture is even more pronounced. By doing this, a common point is created at the EBPCU 10 between the source DC1 (or DC2) and the source DCBatt, but never between the sources DC1 and DC2. If a power failure propagates from DC1 to DCBatt, the source DC2 will still be available for the normal system, and braking will still be possible with that system.

It can further be envisaged to provide the pedal signal 6 to the EBPCU 10 in order to create an additional braking mode (differential braking without antiskid) in the event of losing the EMACs 3 or the PSUs 5.

Communication between the BCU(s) 8 and the EBPCU 10, could also be put in place and that makes it possible for the BCUs to regularly test the EBPCU 10 to check that it is operating correctly, since the EBPCU 10 is used only very exceptionally.

What is claimed is:

1. An asymmetrical electric braking architecture for aircraft, comprising a plurality of electro-mechanical brake actuators for selectively applying a braking force on friction elements in order to slow down rotation of braked wheels, said architecture comprising:

a brake control unit for acting in normal mode to generate braking setpoint values in response to a braking order;

a plurality of electro-mechanical actuator controllers, each powered by an AC electrical power source, and each including at least one inverter for supplying electrical power to the plurality of the electro-mechanical brake actuators in response to the braking setpoint values;

at least one emergency brake power and control unit powered only by a DC electrical power source, and including at least one inverter for supplying electrical power to some of the plurality of the electro-mechanical brake actuators in response to the braking order; and protection means for channeling power supplied by the electro-mechanical actuator controllers or the emergency brake power and control unit towards the actuators while preventing power from being diverted towards the architecture, wherein the brake control unit and the plurality of electro-mechanical actuator controllers define a normal braking system, wherein the at least one emergency brake power and control unit defines an emergency braking system, and wherein the electric braking architecture is configured to be asymmetrical by excluding all elements of the normal braking system from being used in the emergency braking system.

2. The asymmetrical electric braking architecture for aircraft according to claim 1, wherein the braking order received by the brake control unit comes from brake pedals or from a parking brake lever, while the braking order received by the emergency brake power and control unit comes solely from the parking brake lever.

3. The asymmetrical electric braking architecture according to claim 2, wherein the electro-mechanical actuator controllers powering the electro-mechanical brake actuators of a given wheel are powered by two separate power sources comprising respectively an AC power supply for supplying power to the inverters, and a DC power source for supplying power to electronic cards of the electro-mechanical actuator controllers.

4. The asymmetrical electric braking architecture according to claim 3, wherein the emergency brake power and control unit is powered by a power source that is distinct from the power sources that power the electro-mechanical actuator controllers.

5. The asymmetrical electric braking architecture according to claim 1, wherein on each of the wheels, a first half of the electro-mechanical brake actuators are powered by a first electro-mechanical actuator controller of said plurality of electro-mechanical controllers, and a second half of the electro-mechanical brake actuators are powered by a second electro-mechanical actuator controller of said plurality of electro-mechanical controllers, only the actuators of the second half being powered by the emergency brake power and control unit.

6. The asymmetrical electric braking architecture according to claim 1, wherein the protection means for channeling power supplied either by the electro-mechanical actuator controllers, or by the emergency brake power and control unit, towards the electro-mechanical brake actuators by preventing power being diverted towards the architecture, includes passive and/or active devices disposed on power lines of the electro-mechanical brake actuators, upstream of a common point between said power lines.

7. The asymmetrical electric braking architecture according to claim 1, wherein the emergency brake power and control unit includes hardware means for determining the braking setpoint value for controlling the associated inverter.

8. An asymmetrical electric braking architecture for aircraft, comprising a plurality of electro-mechanical brake actuators for selectively applying a braking force on friction elements in order to slow down rotation of braked wheels, said architecture comprising:

a brake control unit for acting in normal mode to generate braking setpoint values in response to a braking order;

electro-mechanical actuator controllers, each powered by an AC electrical power source, and each including at least one inverter for supplying electrical power to the electro-mechanical brake actuators in response to the braking setpoint values;

at least one emergency brake power and control unit powered only by a DC electrical power source, and including at least one inverter for supplying electrical power to some of the electro-mechanical brake actuators in response to a braking order; and protection means for channeling power supplied by the electro-mechanical actuator controllers or the emergency brake power and control unit towards the actuators while preventing power from being diverted towards the architecture, wherein each electro-mechanical braking actuator includes a blocking member and/or a resolver that is/are powered by the electro-mechanical actuator controllers but not by the emergency brake power and control unit.

* * * * *